(12) United States Patent
Davison et al.

(10) Patent No.: US 6,749,209 B2
(45) Date of Patent: Jun. 15, 2004

(54) SUSPENSION AND AXLE ASSEMBLY

(75) Inventors: Kent Davison, Sturgis, MI (US); Kraig Schlosser, Columbia City, IN (US)

(73) Assignee: Dana Corporation, Toledo, OH (US)

( * ) Notice: Subject to any disclaimer, the term of this patent is extended or adjusted under 35 U.S.C. 154(b) by 70 days.

(21) Appl. No.: 10/136,811

(22) Filed: May 1, 2002

(65) Prior Publication Data

US 2003/0205879 A1 Nov. 6, 2003

(51) Int. Cl.[7] .................................................. B60G 9/02
(52) U.S. Cl. ...................... 280/124.116; 280/124.109; 301/127
(58) Field of Search ............................... 301/127, 124.1; 280/124.116, 124.11, 124.109, 124.1

(56) References Cited

U.S. PATENT DOCUMENTS

| | | | |
|---|---|---|---|
| 2,905,459 A | | 9/1959 | Fikse |
| 2,960,350 A | | 11/1960 | Broughton et al. |
| 3,007,715 A | * | 11/1961 | Maharick ............. 280/124.116 |
| 3,007,716 A | * | 11/1961 | Maharick ............. 280/124.116 |
| 3,735,999 A | | 5/1973 | Blackledge et al. |
| 3,785,672 A | * | 1/1974 | Shakespear ............... 280/6.157 |
| 3,961,826 A | * | 6/1976 | Sweet et al. ................. 301/125 |
| 4,165,098 A | * | 8/1979 | Wagner ............... 280/124.116 |
| 4,165,099 A | * | 8/1979 | Wagner et al. ......... 280/124.116 |
| 4,310,171 A | * | 1/1982 | Merkle ..................... 280/86.75 |
| 4,750,757 A | * | 6/1988 | Long ................... 280/124.106 |
| 5,201,898 A | * | 4/1993 | Pierce ....................... 280/86.75 |
| 5,409,254 A | | 4/1995 | Minor et al. |
| 5,518,265 A | | 5/1996 | Buthala et al. |
| 5,746,441 A | * | 5/1998 | VanDenberg ........ 280/124.116 |
| 5,791,681 A | | 8/1998 | VanDenberg |
| 5,988,672 A | * | 11/1999 | VanDenberg ............... 280/683 |
| 6,039,336 A | | 3/2000 | Frey |
| 6,109,630 A | * | 8/2000 | Dazy et al. ............. 280/124.11 |
| 6,357,769 B1 | * | 3/2002 | Omundson et al. ... 280/124.109 |
| 6,460,869 B1 | * | 10/2002 | Tremouilles ......... 280/124.116 |
| 6,543,857 B1 | | 4/2003 | Griffiths et al. |

FOREIGN PATENT DOCUMENTS

| | | |
|---|---|---|
| DE | 30 06 240 A | 8/1981 |
| EP | 0 296 568 A | 12/1988 |
| GB | 2 355 698 A | 5/2001 |

* cited by examiner

*Primary Examiner*—Charles T. Jordan
*Assistant Examiner*—T. Nguyen
(74) *Attorney, Agent, or Firm*—Dykema Gossett PLLC

(57) ABSTRACT

A suspension and axle assembly is provided having two identical stampings, each of which form a portion of an axle and a portion of first and second suspension control arms that extend from the axle. The two stampings are coupled to one another along a continuous weld path. The assembly eliminates the connection points between the axle and control arms. The assembly also defines a pair of bores in which springs may be disposed at varying heights to lower the vehicle floor and reduce loads on the control arms, bushings, and other joints.

12 Claims, 2 Drawing Sheets

SUSPENSION AND AXLE ASSEMBLY

BACKGROUND OF THE INVENTION

1. Field of the Invention

This invention relates to a suspension and axle assembly and more particularly to a suspension and axle assembly for a trailer designed to reduce weight, stress and fatigue within the assembly.

2. Disclosure of Related Art

In a conventional vehicle, one or more axles having ground-engaging wheels on either side support a frame of the vehicle. The axles are coupled to the frame by a suspension that dampens movements and loads between the frame and the axles. In one conventional suspension and axle assembly for a trailer, a pair of arms extend between the brackets descending from the trailer frame and the axle. Typically, the arms are pivotally coupled to the brackets of the frame and are rigidly coupled to the axle. Springs are disposed on either side of the axle and extend from the top of the axle to the frame.

The above-described conventional suspension and axle assembly suffers from several drawbacks. The assembly is subject to stress and fatigue at the connections between the axle and suspension arms leading to failures at the connections. The assembly is also relatively heavy. Finally, the location of the springs creates significant loads on the suspension arms and on bushings and joints and limits positioning of the vehicle floor.

The inventors herein have recognized a need for a suspension and axle assembly that will minimize or eliminate one or more of the above-mentioned deficiencies.

SUMMARY OF THE INVENTION

The present invention provides suspension and axle assembly for a vehicle.

In accordance with the present invention, a suspension and axle assembly includes first and second members that are coupled together. Each of the first and second members define both a portion of an axle and portions of first and second suspension control arms at either end of the axle portion. In one embodiment of the present invention, the first member and second members are identical to each other. The first and second members may further define first and second bores configured to receive first and second springs therein.

A suspension and axle assembly in accordance with the present invention represents a significant improvement as compared to conventional assemblies. In particular, the inventive assembly eliminates the rigid connection points between the axle and the suspension arms by integrating the axle and arms thereby reducing the likelihood of failure from stress and fatigue. The inventive assembly also weighs less than conventional assemblies. Finally, the inventive assembly enables the springs to be received within the axle body proximate the axle centerline. As a result, the inventive assembly reduces loads on the suspension arms, bushings and joints and allows for a variable, and lower, floor height due to the ability to position the springs at varying locations within the bores.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
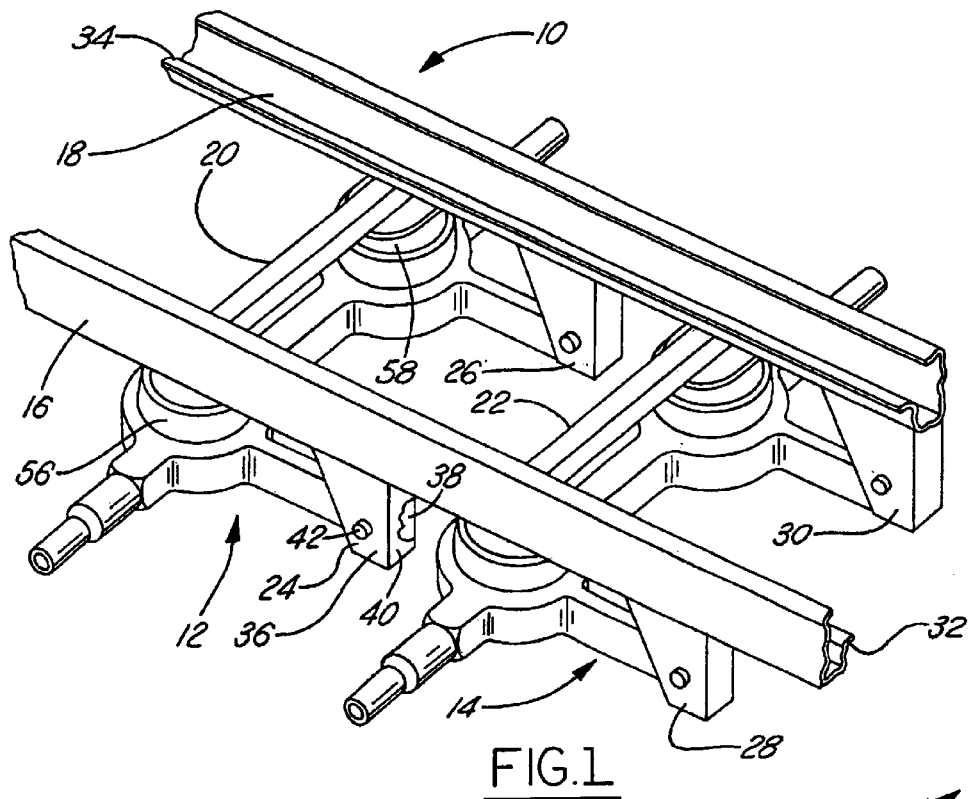
FIG. 1 is a perspective view of a portion of a vehicle frame incorporating a suspension and axle assembly in accordance with the present invention.

Referring now to the drawings wherein like reference numerals are used to identify identical components in the various views, FIG. 1 illustrates a portion of a vehicle frame 10 supported on a pair of suspension and axle assemblies 12, 14 in accordance with the present invention. In the illustrated embodiment, frame 10 comprises a frame for a semi-trailer. It should be understood, however, that the inventive assembly may find application on a wide variety of vehicle frames.

Frame 10 provides structural support to the body of the vehicle. Frame 10 is conventional in the art and may be made from conventional metals and metal alloys such as steel. Frame 10 may include a pair of longitudinal rails 16, 18, one or more cross-members 20, 22. Frame 10 may also include a plurality of mounting brackets, such as brackets 24, 26, 28, 30, for mounting various components of the vehicle including assemblies 12, 14.

Rails 16, 18 are provided to secure and align a trailer (not shown) on frame 10 and are conventional in the art. Rails 16, 18 are generally C-shaped in cross-section, with a flange 32, 34 extending transverse to the longitudinal direction of each of rails 16, 18.

Cross-members 20, 22 are provided to connect rails 16, 18 and are conventional in the art. Cross-members 20, 22 may also provide a means for mounting components of assemblies 12, 14 and may provide a bearing surface for the springs of assemblies 12, 14.

Brackets 24, 26, 28, 30 are provided to mount components of assemblies 12, 14 to frame 10. Brackets 24, 26, 28, 30 are conventional in the art. Each of brackets 24, 26, 28, 30 may include a pair of spaced sidewalls 36, 38 and a rear wall 40. Sidewalls 36, 38 may define aligned apertures configured to receive a pin 42 extending from either side of a bushing (not shown). It will be understood by those in the art that the number, shape, composition, and configuration of brackets 24, 26, 28, 30 may vary depending upon the design of assemblies 12, 14 and other design requirements associated with the vehicle.

Figure 2:
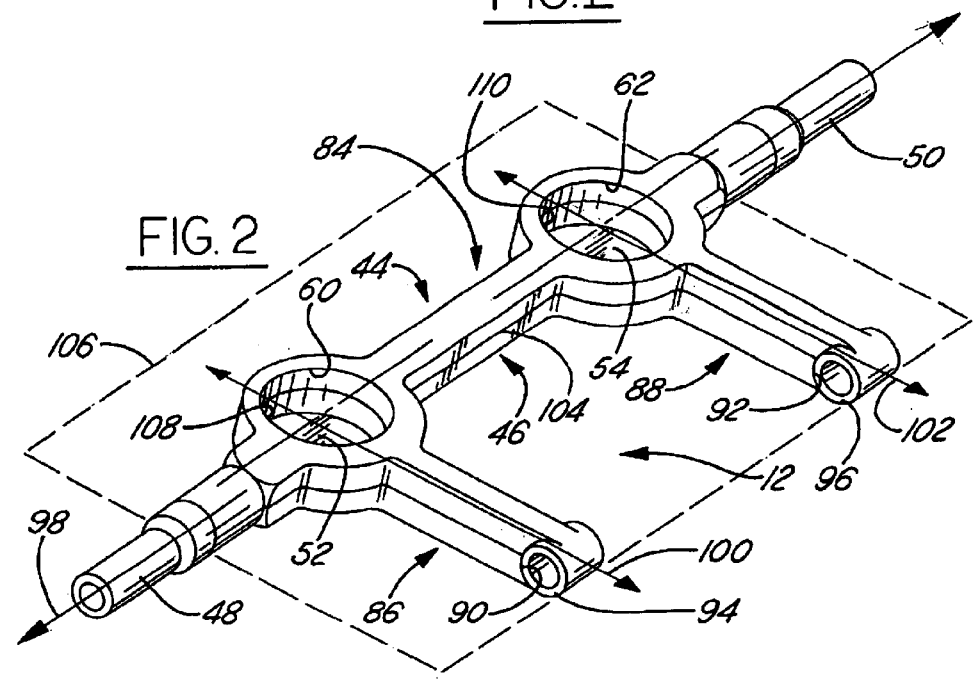
FIG. 2 is a perspective view of a suspension and axle assembly in accordance with the present invention.
Figure 3:
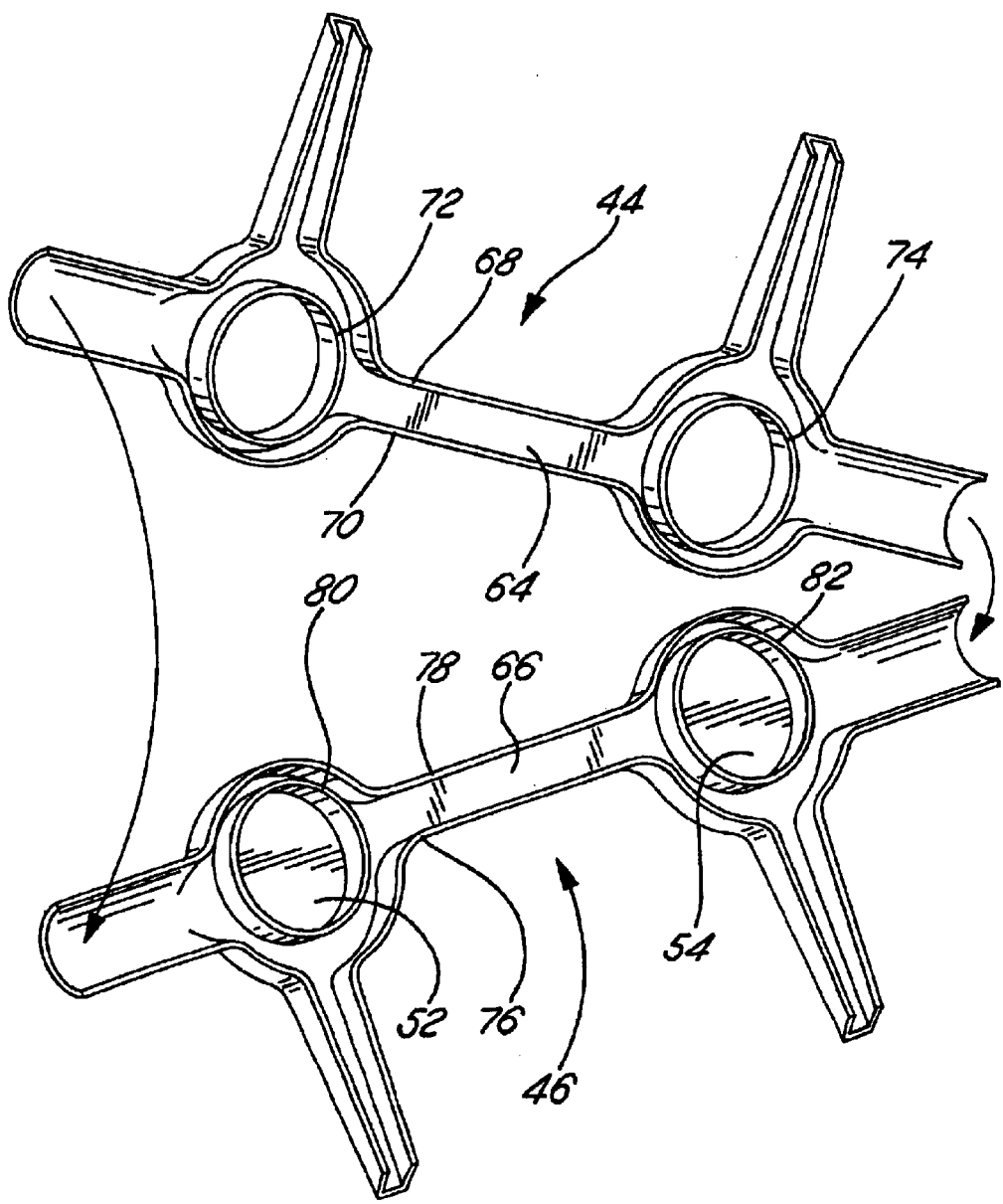
FIG. 3 is an exploded perspective view of the suspension and axle assembly illustrated in FIG. 2.

Referring now to FIGS. 2 and 3, a suspension and axle assembly 12 for a vehicle in accordance with one embodiment of the present invention will be described. It should be understood that assembly 14 is substantially similar in construction. Assembly 12 is provided to rotatably support wheels (not shown) of the vehicle, braking systems (not shown), and other components and to support frame 10. Assembly 12 may include members 44, 46, spindles 48, 50, plates 52, 54, springs 56, 58 (shown in FIG. 1), and liners 60, 62.

Members 44, 46 form the body of assembly 12. Members 44, 46 may be made from conventional metals and metal alloys such as steel and may be formed by a conventional stamping operation. In the illustrated embodiment, members 44, 46 are identical to one another. Accordingly, members 44, 46 may be formed using the same tooling and then may be oriented so as to create a mirror image. It should be understood, however, the members 44, 46 may be different from one another in any of size, shape or composition without departing from the spirit of the present invention. Referring to FIG. 3, each of members 44, 46 may define a top or bottom (depending on perspective) wall 64, 66, respectively, and a plurality of sidewalls 68, 70, 72, 74 and 76, 78, 80, 82 extending from walls 64, 66, respectively. In the illustrated embodiment, members 44, 46 define an assembly 12 that is tubular when assembled and includes cross-sections that are circular and rectangular. As a result of its tubular construction, the inventive assembly 12 uses less material and weighs less than conventional assemblies. It should be understood, however, that the design of members 44, 46 may vary in response to design parameters associated with other components of the vehicle.

Referring again to FIG. 2, each of members 44, 46 define a portion of an axle 84 and portions of suspension control arms 86, 88 proximate either end of the portion of axle 84. In the illustrated embodiment, arms 86, 88 comprise trailing arms. It should be understood, however, that arms 86, 88 may alternatively comprise forward arms. Arms define semicircular recesses 90, 92 configured to receive bushing sleeves 94, 96. Alternatively members 44, 46 may each define a portion of sleeves 94, 96. Sleeves 94, 96 may be received within side walls 36, 38 of brackets 24, 26 and are configured to receive bushings (not shown) so as to allow pivoting movement of arms 86, 88 within brackets 24, 26. Axle 84 may be centered about a longitudinal axis 98 which may also form a longitudinal axis of assembly 12. Similarly, arms 86, 88 may be centered about longitudinal axes 100, 102. Axes 100, 102 may be perpendicular to axis 98.

Members 44, 46 may be coupled together along a continuous weld path 104. The weld path 104 may lie in a single plane 106 extending parallel to the ground and the longitudinal direction of the vehicle. In the illustrated embodiment, plane 106 contains each of axes 98, 100, 102. Upon coupling, walls 72, 80 and 74, 82 of members 44, 46 define bores 108, 110 for a purpose described hereinbelow. Each of bores 108, 110 may be generally cylindrical and the center of each bore 108, 110 may be disposed at the intersection of axes 98 with axes 100, 102, respectively.

Spindles 48, 50 are provided to support wheels (not shown) on wheel bearings (not shown). Spindles 48, 50 are conventional in the art and may be coupled to members 44, 46 in a conventional manner.

Plates 52, 54 provide a seat for springs 56, 58. Plates 52, 54 may be made from conventional metals and metal alloy such as steel. Plates 52, 54 may be generally circular in shape and are sized to be received within bores 108, 110, respectively. Plates 52, 54 may be coupled within bores to one or more of walls 72, 80 and 74, 82 through welding or in other conventional ways. The location of plates may be varied to vary the height of springs 56, 58 relative to assembly 12.

Referring to FIG. 1, springs 56, 58 are provided to dampen movements between frame 10 and assembly 12. Springs 56, 58 are conventional in the art. In the illustrated embodiment, springs 56, 58 comprise air springs. It will be understood, however, that springs 56, 58 may alternatively comprise mechanical springs. Springs 56, 58 are disposed between spring seats formed by plates 52, 54 with bores 106, 108 of assembly 12 and spring seats formed on frame 10. The inventive assembly 12 allows springs 56, 58 to be located at varying heights by positioning plates 52, 54 within bores 106, 108 thereby allowing for a variable, and lower floor height, for the vehicle as compared to conventional assemblies. Further, springs 56, 58 may be positioned proximate the centerline (i.e., axis 98) of axle 84 thereby reducing loads on the suspension arms 86, 88, the bushings (not shown) and other joints.

Liners 60, 62 are provided to reduce the wear on springs 56, 58. Liners 60, 62 may be made from a material, such as a plastic, having a relatively low coefficient of friction. Liners 60, 62 are coupled to walls 72, 80 and 74, 82 in a conventional manner.

While the invention has been particularly shown and described with reference to the preferred embodiments thereof, it is well understood by those skilled in the art that various changes and modifications can be made in the invention without departing from the spirit and scope of the invention.

We claim:

1. An axle and suspension assembly for a vehicle comprising:

a first member; and a second member;

wherein said first and second members are coupled together, each of said first and second members defining a portion of an axle and portions of first and second suspension control arms proximate either end of said portion of an axle, said first and second members further defining first and second bores configured to receive first and second springs therein, a center of said first bore disposed along a central longitudinal axis of said first control arm and a center of said second bore disposed along a central longitudinal axis of said second control arm.

2. The assembly of claim 1 wherein said first and second members are coupled together with a weld lying entirely within a plane containing a longitudinal axis of the assembly, said plane extending parallel to the longitudinal direction of the vehicle.

3. The assembly of claim 1 wherein longitudinal axes of said first and second control arms are perpendicular to a longitudinal axis of said axle.

4. The assembly of claim 1 wherein first and second spring seat plates are disposed within said first and second bores.

5. The assembly of claim 4 wherein said first and second spring seat plates are welded to at least one of said first and second members.

6. The assembly of claim 1 wherein said first and second bores are lined with material having a relatively low coefficient of friction.

7. An axle and suspension assembly for a vehicle comprising:

a first member; and a second member;

wherein said first and second members are coupled together, each of said first and second members defining a portion of an axle and portions of first and second suspension control arms proximate either end of said portion of an axle, said first and second members further defining first and second bores configured to receive first and second springs therein, a center of said first bore disposed along a central longitudinal axis of said axle and a center of said second bore disposed along said central longitudinal axis of said axle.

8. The assembly of claim 7 wherein said first and second members are coupled together with a weld lying entirely within a plane containing a longitudinal axis of the assembly, said plane extending parallel to the longitudinal direction of the vehicle.

9. The assembly of claim 7 wherein longitudinal axes of said first and second control arms are perpendicular to a longitudinal axis of said axle.

10. The assembly of claim 7 wherein first and second spring seat plates are disposed within said first and second bores.

11. The assembly of claim 10 wherein said first and second spring seat plates are welded to at least one of said first and second members.

12. The assembly of claim 7 wherein said first and second bores are lined with material having a relatively low coefficient of friction.

* * * * *